(12) United States Patent
Miranker et al.

(10) Patent No.: US 6,782,505 B1
(45) Date of Patent: Aug. 24, 2004

(54) METHOD AND SYSTEM FOR GENERATING STRUCTURED DATA FROM SEMI-STRUCTURED DATA SOURCES

(76) Inventors: Daniel P. Miranker, 5225 Fossil Rim Rd., Austin, TX (US) 78746; L. Lance Obermeyer, 5117 Jekins Cove, Austin, TX (US) 78730; Paul A. Navratil, 2600 Rio Grande St., Austin, TX (US) 78705

( * ) Notice: Subject to any disclaimer, the term of this patent is extended or adjusted under 35 U.S.C. 154(b) by 0 days.

(21) Appl. No.: 09/294,701

(22) Filed: Apr. 19, 1999

(51) Int. Cl.[7] ............................ G06F 15/00; G06F 7/00; G06F 17/21; G06F 17/00
(52) U.S. Cl. ...................... 715/513; 715/501.1; 707/10; 707/102; 707/103
(58) Field of Search ................................ 707/102, 103, 707/513, 10, 4; 715/513, 501.1, 500

(56) References Cited

U.S. PATENT DOCUMENTS

| | | | | |
|---|---|---|---|---|
| 4,947,438 A | | 8/1990 | Paeseler ..................... | 704/252 |
| 5,826,258 A | * | 10/1998 | Gupta et al. ................... | 707/4 |
| 5,864,863 A | * | 1/1999 | Burrows ..................... | 707/103 |
| 5,913,214 A | * | 6/1999 | Madnick et al. .............. | 707/10 |
| 5,999,939 A | * | 12/1999 | de Hilster et al. .......... | 707/102 |
| 6,021,409 A | * | 2/2000 | Burrows ..................... | 707/102 |
| 6,526,426 B1 | * | 2/2003 | Lakritz ....................... | 715/536 |

OTHER PUBLICATIONS

Ashish, N. et al., Semi–automatic wrapper generation for Internet information sources, IEEE Cooperative Information Systems Jun. 27, 1997, pp. 160–169.*
Huck, G., et al., Jedi: extracting and synthesizing information from the Web, IEEE Cooperative Information Systems 1998, pp. 32–41, Aug. 1998.*
Gruser, J. et al., Wrapper generation for Web accessible data sources, IEEE Cooperative Information Systems 1998, pp. 14–23, Aug. 1998.*
Weigel, A. et al., Lexical postprocessing by heuristic search and automatic determination of the edit costs, IEEE Document Analysis and Recognition, 1995, pp. 857–860, Aug. 1995.*
Hardy, Darren R. et al, Customized information extraction as a basis for resource discovery, ACM Transactions on Computer Systems, vol. 14, Issue 2, 1996, pp. 171–199, 1996.*
Aggarwal, S. et al., WIRE–a WWW–based information retrieval and extraction system, IEEE Database and Expert Systems Applications, pp. 887–892, Aug. 1998.*
Kurz, A. et al., Data Warehousing within intranet: prototype of a web–based executive information system, IEEE Database and Expert Systems Applications, pp. 627–632, Sep. 1997.*
"An Efficient Context–Free Parsing Algorithm" by Jay Earley of the University of California, Berkeley, California dated Feb., 1970, vol. 13, No. 2.
Cyber View "Hello, Is This the Web?" from Scientific American, Dec. 1998.

* cited by examiner

Primary Examiner—Sanjiv Shah
Assistant Examiner—William L. Bashore
(74) Attorney, Agent, or Firm—LAVA Group Law by Smith & Frohwein; Gregory Scott Smith

(57) ABSTRACT

A system and method for generating structured data outputs from a semi-structured data source. The steps of this method include generating an example output from an example generator. The example output is generated in response to the acquisition of a sequence of annotated strings. The annotated strings are generated in response to the acquisition and modification of at least one data example and corresponding coarse structure from a predetermined input source. Also, a second sequence of annotated strings is generated from input from a semi-structured data source. Both the example output and second sequence of annotated strings are input to an acquisition engine that implements a grammar layer incorporating a top-down parsing method and a comparison layer. The structured data outputs are generated through the cooperation of the comparison layer and the grammar layer.

7 Claims, 4 Drawing Sheets

| PATTERN | PHONEMES WEIGHTS | CONTEXT FREE GRAMMAR TERMINAL |
|---|---|---|
| P0 | p1w1 p2w2 | E |
| P1 | | |
| | | |
| | | |
| Pm | | |

FIG.6

METHOD AND SYSTEM FOR GENERATING STRUCTURED DATA FROM SEMI-STRUCTURED DATA SOURCES

TECHNICAL FIELD OF THE INVENTION

The present invention relates generally to data acquisition and structuring systems and methods, and more particularly, a system and method for generating structured data outputs from semi-structured data inputs.

BACKGROUND OF THE INVENTION

The general field of this invention relates to generating structured data outputs from semi-structured data inputs. A particular application of the invention is acquiring and structuring data to form virtual internet databases. Virtual internet databases are databases whose content is owned, stored and managed on servers distributed across a computer network.

Recently, internet usage and access has increased markedly. The availability and quantity of information on the internet has also increased. Many software products that can produce printed reports can now produce WEB reports. These products produce reports that may be displayed on a WEB page. This is accomplished by embedding the text of the report within the computer language called HTML. Although posted reports and information appear as data on the WEB page, this HTML representation is not a data representation. Rather, the WEB browser serves as a vehicle to display information much like that of a page in a textbook. This presents the problem of incompatibility between the HTML representation and the PC desktop and server applications. Ultimately, the current practice of employing WEB browsers has reduced PCs back to "dumb" terminals. The graphics may be exciting, but functionally all the computing power is limited to providing users with little more than a sophisticated data viewing window.

Several methods have been developed to address the problem of moving semi-structured data from the internet to a PC or server application. These methods include ad hoc engineering methods, Graphical User Interface (GUI) methods, and machine learning methods.

Ad hoc methods entail writing specialized parsing programs in a language such as PERL or LEX to extract the necessary information. These types of programs are called wrappers. A wrapper is a software method that converts data such as HTML code into structured data for further processing. These types of programs employ the use of regular expressions in the parsing process. Unfortunately, these ad hoc methods are labor intensive. Depending on the skill of the programmer and the complexity of the particular job, these methods can take days to develop. Also, these methods are not an option for an average internet user with no formal training or knowledge of HTML and programming methods.

Due to the tedious nature of custom wrapper design, further methods have been developed that employ GUIs to facilitate the wrapper generation. The GUI hides all the engineering details beyond the extracted data pattern definitions. Like the ad hoc methods discussed above; these packages implement regular expression parsing algorithms. In general these methods require some knowledge of both HTML and regular expressions, therefore they may not be suitable to some internet users.

Due to the use of regular expressions, both ad hoc methods and GUI methods can result in what is called brittle parses. Brittle parses result when changes in format of the HTML page cause the parse to fail. A single format change is not guaranteed to break the parse, but the likelihood is sufficiently high as to prevent any guarantees of robust behavior.

Recently, machine learning methods have been developed to address the need for engineering skills in the development of wrappers. Given a set of similar WEB pages and an example of the data to be parsed from each page, these methods automatically generate a wrapper. Unfortunately, these methods require a large number of examples to reliably produce wrappers. An example of such a method can be found in *A Hierarchical Approach to Wrapper Induction*, Muslea, et al. (1999). This method may require 8–10 examples to produce the wrappers. The generated wrappers are based on regular expression techniques and are brittle. Although these wrappers may work for format changes known prior to wrapper generation, they may fail on empirical format changes as the regular expression based methods discussed above.

Ideally, it is desirable to develop a method for a user to gain access to semi-structured data for a PC or server application without requiring the user to have previous knowledge HTML or regular expressions. In addition, it is advantageous if the method does not require the enumeration of examples covering possible format changes.

SUMMARY OF THE INVENTION

The present invention provides a system and method for acquiring and structuring data from semi-structured data sources that substantially eliminates or reduces disadvantages and problems associated with previously developed systems and methods used for developing structured data sources from on-line sources such as the Internet, intranets, or other network systems.

More specifically, the present invention provides a system for generating structured data outputs from semi-structured data sources. The steps of this method include generating an example output from an example generator. The example output is generated in response to the acquisition of a sequence of annotated strings. The annotated strings are generated in response to the acquisition and modification of as little as one data example and a corresponding coarse structure from a predetermined input source. Also, a second sequence of annotated strings in generated from input from a semi-structured data source. Both the example output and second sequence of annotated strings are input to an acquisition engine that implements a grammar layer incorporating a top-down parsing method and a comparison layer. The structured data outputs are generated through the cooperation of the comparison layer and the grammar layer.

The present invention provides an important technical advantage in that it does not require the user to have knowledge of HTML or knowledge of pattern matching languages. The graphical interface guides the user through a set-up phase and completely hides all technical details.

The present invention provides an important technical advantage in that it requires only one single data example. Once this set-up process is complete, the acquisition engine can be pointed to related WEB pages, as well as up-dated versions of the same page, and it will automatically extract data and route it to applications.

The present invention provides yet another technical advantage in that the system is able to cope with the format changes from the source pages, including changes in the order of data values. Thus, the technology produces reliable results even when the data sources are re-formatted, updated or amended by the content providers.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 6 represents an example of the pattern dictionary including patterns of phonemes and the corresponding terminals of the context free grammar.

DETAILED DESCRIPTION OF THE INVENTION

Preferred embodiments of the present invention are illustrated in the FIGUREs, like numerals being used to refer to like and corresponding parts of the various drawings.

The present invention provides a system and method for generating structural data outputs from semi-structured data inputs. Details of embodiments of the present invention are discussed below.

Figure 1:
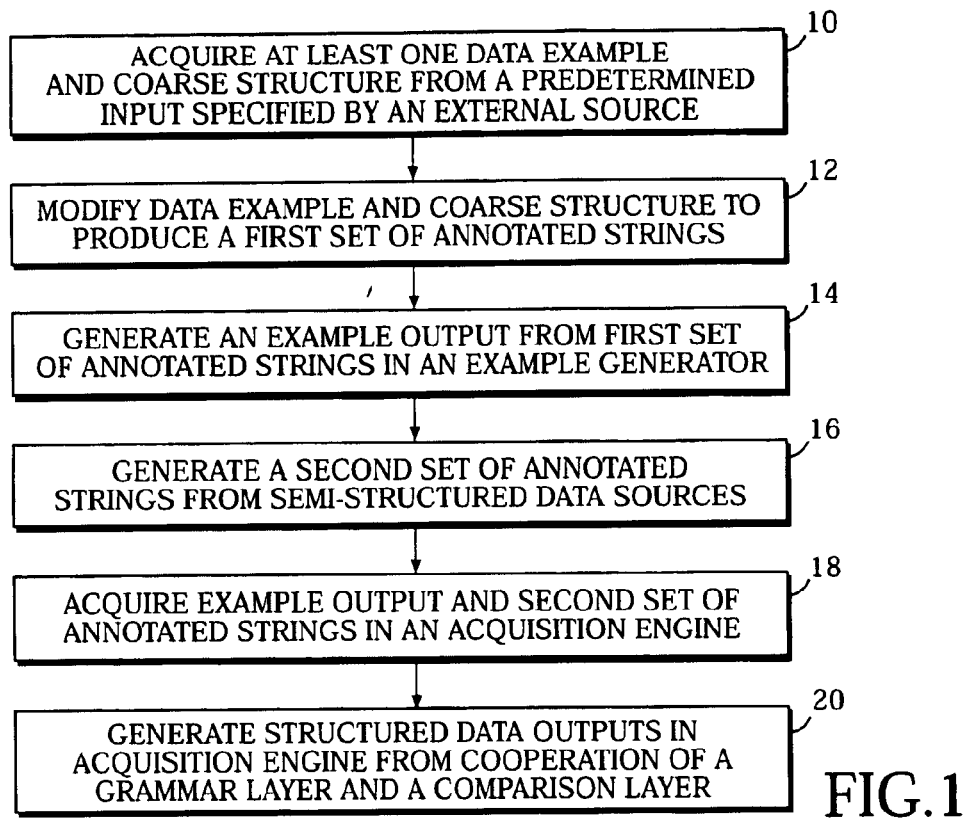
FIG. 1 is a flow diagram of one embodiment of the present invention.

FIG. 1 is the flow diagram of one embodiment of the present invention. At step 10, at least one data example and coarse structure is acquired from a predetermined input specified by an external output. The at least one data example can be exactly one data example. This predetermined input serves to present an example of the type of data to be acquired and structured. Such a type of predetermined input can be PDF files, semi-structured text files, or HTML files. The external source can be a storage means such as a database server or a WEB server. At step 12, the data example and coarse structure are modified to produce a first set of annotated strings. These annotated strings serve as data structures providing one or more attributes regarding each data example and the coarse structure.

At step 14, an example output is generated in an example generator from the first set of annotated strings. The example output comprises a pattern dictionary containing at least one annotated string associated with a terminal that represents a terminal of a context free grammar. At step 16, a second set of annotated stings are generated from at least one semi-structured data source. The semi-structured data sources serve as the source of data which is to be acquired and structured. A source for such semi-structured data sources can be a database server or WEB server. At step 18, the example output and the second set of annotated strings are acquired by the acquisition engine. In turn, at step 20, the acquisition engine generates the structured data outputs from cooperation of a grammar layer and a comparison layer contained within the acquisition engine. The grammar layer and comparison layer work in cooperation to locate in the second set of annotated strings the desired data outputs based on the example output from the example generator.

Figure 2:
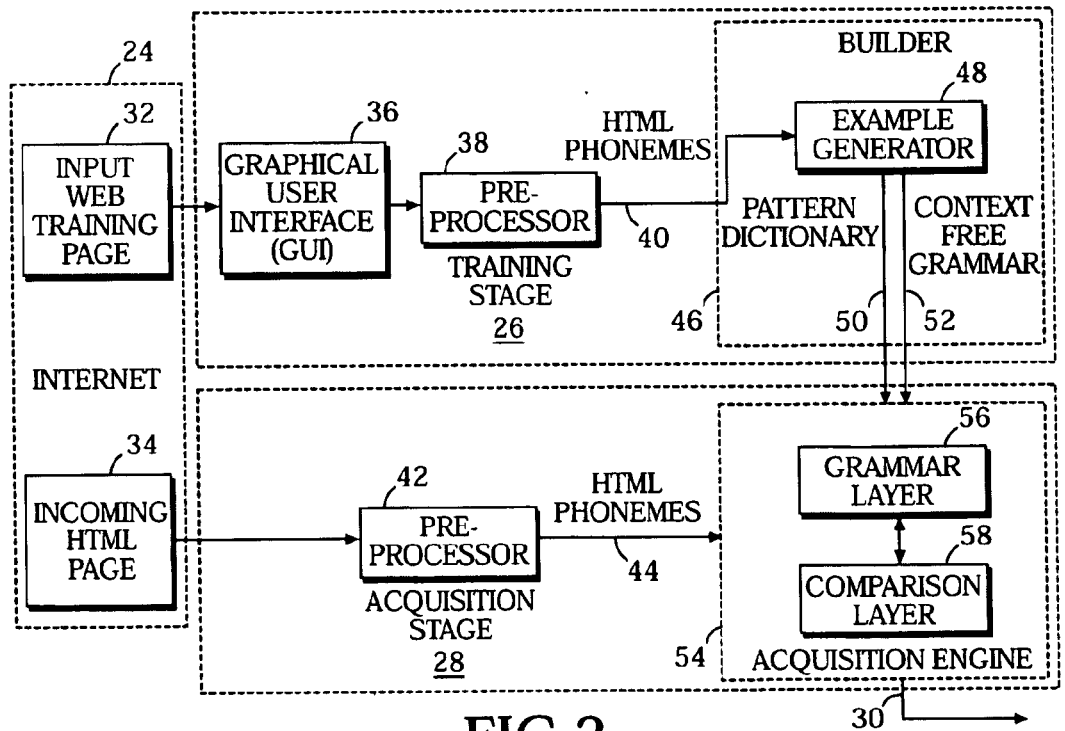
FIG. 2 is a block diagram of the gross architectural breakdown 10 of an embodiment of the present invention.

FIG. 2 is a block diagram of the gross architectural breakdown 20 of one embodiment of the present invention. The gross architectural breakdown 20 can be divided into two major parts: the training stage 26 and the acquisition stage 28. The internet 24 provides both the training stage 26 and the acquisition stage 28 with an input WEB training page 32 to be used to extract an example and train the system as to the type of information and format of information desired. The internet 24 also provides the acquisition stage 28 with the semi-structured data sources, incoming HTML pages 34, to search for and structure the type of data specified by the training stage 26. These two stages, the training stage 26 and the acquisition stage 28, can be further broken down. The training stage 26 is comprised of a GUI 36, preprocessor 38, and a builder 46 containing an example generator 48. The GUI 36 is used to extract information from the input WEB training page 32 located on the internet 24. The preprocessor 38 then interfaces with the GUI 36 to produces HTML phonemes 40 representing the extracted information from the input WEB training page 32.

The HTML phonemes 40 are input to the example generator 48. Example generator 48 converts the HTML phonemes 40 into a series of patterns which populate a pattern dictionary 50 and generates a context-free grammar 52. Patterns in the pattern dictionary 50 may include the user input with phonemes 40 on each side and a corresponding weight for each phoneme. There can be multiple patterns in the pattern dictionary 50. The pattern dictionary 50 and the context-free grammar 52 are then input into the acquisition stage 28, specifically the acquisition engine 54. HTML phonemes 44 generated from the incoming HTML page 34 through the use of a preprocessor 42, are also input into the acquisition engine 54. The acquisition engine 54 can be broken down further into a grammar layer 56 and a comparison layer 58. The pattern dictionary 50 and a context free grammar 52 are used to extract the structured data outputs 30 contained within the HTML phonemes 44. These structured data outputs 30 are outputs of the acquisition engine 54.

Figure 3:
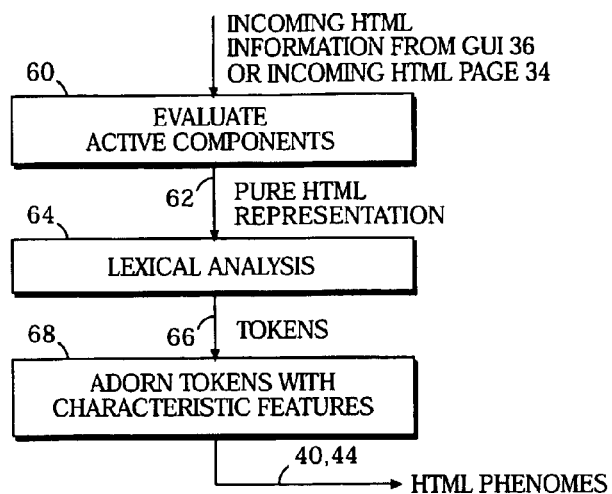
FIG. 3 is a flow diagram for the generation of HTML phonemes of the embodiment of FIG. 1.

FIG. 3 is a flow diagram for the generation of HTML phonemes 40, 44. A pure HTML representation 62 of the incoming HTML information from the GUI 36 or the incoming HTML page 34 is created from step 60. The incoming HTML information may contain scripts and/or call backs to the web-server, so called active components. At step 60, these active components of the incoming HTML information are converted to a pure HTML representation 62 of the HTML information. In turn, lexical analysis is performed at step 64 by breaking the pure HTML representation 62 into substrings called tokens 66. The tokens 66 are then adorned with characteristic features at step 68 which outputs the HTML phonemes 40, 44. These characteristic features include, but are not limited to, markups that change font size, markups that add hyperlinks, strings types, row and column number of HTML table cells associated with strings, and row and column numbers of table cells with respect to the presentation of the semi-structured data within the incoming HTML information from the GUI 36 or the incoming HTML page 34.

Figure 4:
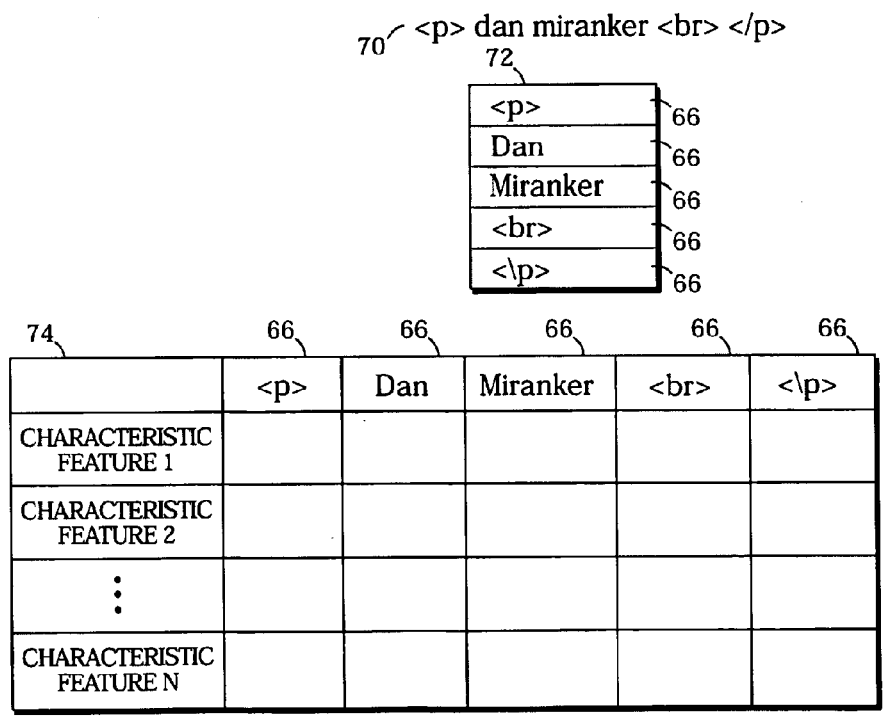
FIG. 4 illustrates the decomposition of HTML stings into tokens and phonemes.

FIG. 4 illustrates an example of decomposing an incoming HTML string 70 from the incoming HTML page 34 into a token list 72. The HTML phonemes chart 74 depicts each token 66 in the income HTML string 70 with its corresponding characteristic features. Each token 66 and its characteristic feature is called an HTML phoneme 44.

Figure 5:
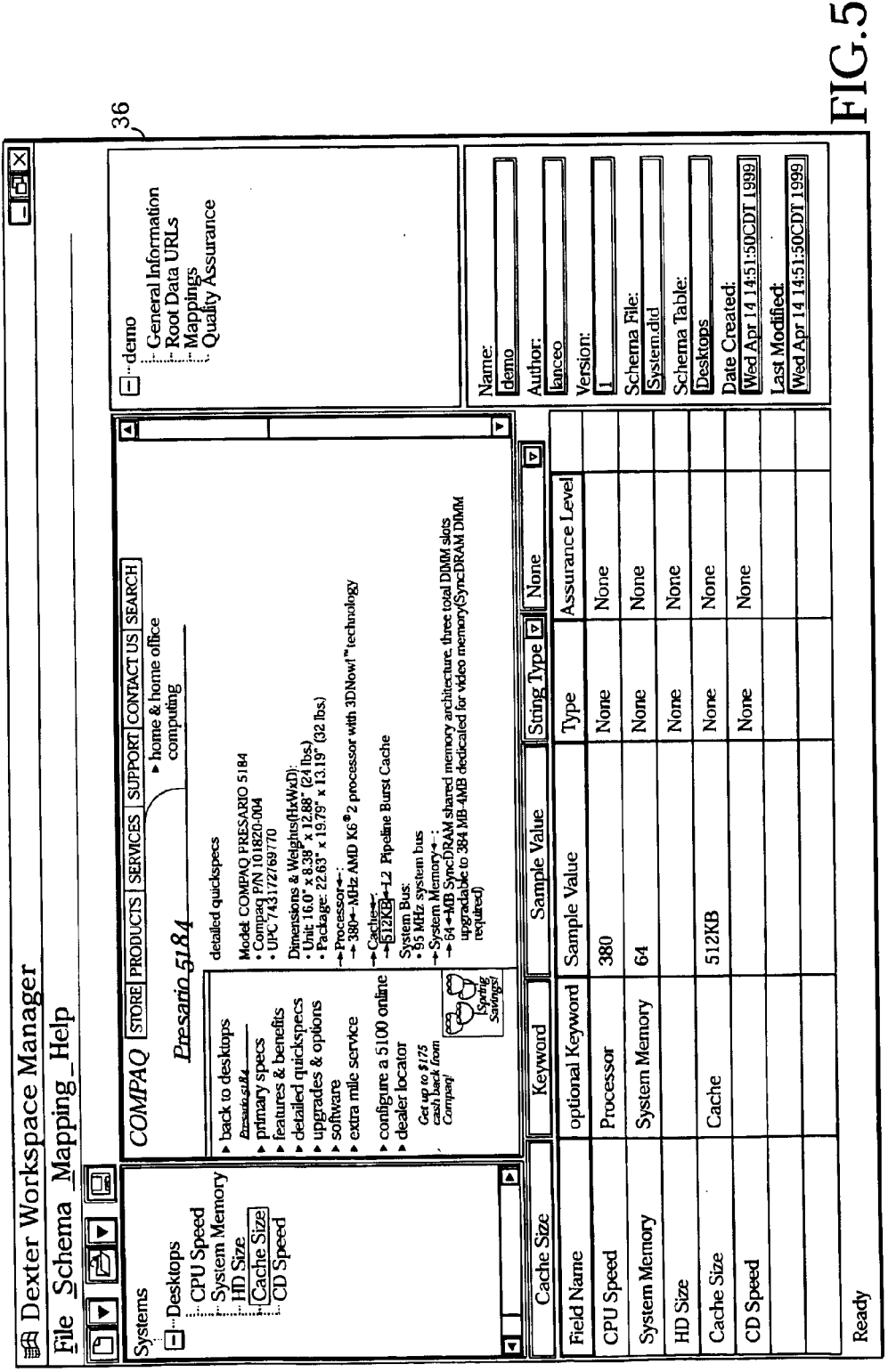
FIG. 5 is an example of the GUI used to extract example data items and the corresponding structure.

FIG. 5 is a representation of the GUI 36 used to extract information for the generation of the context-free grammar 52 in the pattern dictionary 50. The GUI 36 provides the example generator 48 with a coarse structure of the structured data outputs 30 to be acquired. There are multiple coarse structures that will determine the acquisition of the structured data outputs 30. These coarse structures include: one data record, multiple data records from a row major form not necessarily an HTML table, multiple data records from a column major form not necessarily in an HTML table, and nested combinations of the above three structures, including object-like structures. The GUI 36 provides the example generator 48 with HTML phoneme representations of each example data value and phonemes to distinguish the coarse structure. Overall, the net input to the example generator 48 is a mapping of text in the input WEB training page 32 to data values and a structured record.

FIG. 6 is an example of the pattern dictionary 34 generated from the example generator 48. Each pattern $P_j$ consists of a sequence of HTML phonemes 40, $p_0, p_1 \ldots p_n$ and a set of corresponding weights $w_0, w_1 \ldots w_n$. A terminal $T_j$ for the context free grammar is assigned in one-to-one correspondence with each pattern in the pattern dictionary. The context free grammar represents the coarse structure and number of data values to be extracted from the semi-structured data source 34. Once the context-free grammar 52 and the pattern dictionary 50 have been generated in the training stage 26, they are passed to the acquisition engine 54. An example of such an engine can be found in *Modification of Earley's Algorithm for Speech Recognition*, NATO ASI Series, Vol. F46, Paeseler, Annedore (1988), which is incorporated by reference herein in its entirety.

The comparison of patterns from the pattern dictionary 50 with an input stream of HTML phonemes 44 from the incoming HTML page 34 occurs in the comparison layer 58. In the comparison layer 58 a matching score between the pattern in the pattern dictionary 50 and a pattern found in the input stream is calculated. This matching score can be calculated using an weighted edit distance algorithm incorporating top-down methods with pruning or dynamic programming. Examples of such weighted edit distance algorithms can be found in *Pairwise Sequence Alignment*, Geigerich, Robert, and Wheeler, David (last modified May, 1996), <http//:www.techfak.uni-bielefeld.de/bcd/curric/PrwAli/ prwali.html>, which is incorporated by reference herein in its entirety. This algorithm incorporates a normalized weighted sum of scores between phonemes from the pattern in the pattern dictionary 50 and a phoneme, in the input steam of HTML phonemes 44. Recall patterns in the pattern dictionary 50 may have different phonemes and each phoneme has a corresponding weight. Once the matching score is generated, the matching score and the matching pattern from the input HTML stream is supplied to the grammar layer 56. The grammar layer 56 implements a top-down parsing method based on a set of grammar rules from the context free grammar 52 to determine new patterns which can follow the previously found matching pattern. These new patterns are supplied to the comparison layer 58 to complete patterns at the grammar level from the pattern dictionary 50 with which the input stream of the HTML phonemes is to be compared. The process alternates between the grammar layer 56 and the comparison layer 58 until the last of the HTML phonemes 44 from the incoming HTML page 34 are compared. The structured data outputs 30 are output based on the sequence of patterns that has the best cumulative matching score and corresponds to a correct parse of the document defined by the context free grammar 52.

The present invention has many advantages. First the use of a GUI 36 to extract the training information from the input WEB training page 22 hides all the technical details behind the builder 46 and the acquisition engine 54. These enables the use of the present invention by users with little or no previous knowledge of HTML and parsing methods.

In addition the present invention requires a minimum of one data example from the input WEB training page 32 in the training stage 26 to acquire the desired structured data outputs 30. This eliminates time-consuming processes of presenting multiple examples in order to acquire and structure the desired data outputs 30.

An important advantage is that the present invention is able to cope with format changes from the semi-structured data sources. Changes such as font size, font color, or permutations in the data value will not cause the acquisition engine to fail. The characteristic features which adorn the tokens 66 to create the phonemes 40, 44 reflect properties including but not limited to format. Even if the page has undergone formatting changes, the original data value will still have some best match. Due to the cumulative characteristics of a pattern, the weighted edit distance almost always finds the correct match.

It is important to note that regular grammars are a subset of context-free grammars. Therefore, the present invention will work properly for regular grammars, as well.

In summary, the present invention provides a Method and System for Generating Structured Data from Semi-structured Data Sources. The steps of this method include generating an example output from an example generator. The example output is generated in response to the acquisition of a sequence of annotated strings. The annotated strings are generated in response to the acquisition and modification of at least one data example and corresponding coarse structure from a predetermined input source. Also, a second sequence of annotated strings in generated from input from a semi-structured data source. Both the example output and second sequence of annotated strings are input to an acquisition engine that implements a grammar layer incorporating a top-down parsing method and a comparison layer. The structured data outputs are generated through the cooperation of the comparison layer and the grammar layer. The present invention is robust to formatting changes and permutations in the semi-structured data sources. In addition, the present invention is easy to use, requiring no prior knowledge of parsing languages or HTML.

Although the present invention has been described in detail, it should be understood that various changes, substitutions and alterations can be made hereto without departing from the spirit and scope of the invention as described by the appended claims.

What is claimed is:

1. A method for generating structured data outputs from semi-structured data sources, said method comprising:

generating an example output from an example generator in response to an acquisition of a first plurality of annotated strings, said first plurality of annotated strings generated from an acquisition and modification of at least one data example and a corresponding coarse structure from a predetermined input specified by an external source, wherein said acquisition and modification of said at least one data example and said corresponding said coarse structure further comprises separating said at least one data example and corresponding coarse structure utilizing lexical analysis to form a first set of tokens and annotating said first set of tokens with characteristic features to produce said first plurality of annotated strings;

generating a second plurality of annotated strings relating to an input from said semi-structured data sources;

acquiring said example output, and said second plurality of annotated strings in an acquisition engine, said acquisition engine comprising a grammar layer and a comparison layer, said grammar layer comprising a top-down parsing algorithm; and said grammar layer and said comparison layer cooperating to generate structured data outputs from said second plurality of annotated strings based on said example output.

2. The method of claim 1, wherein said predetermined input is a first HTML page and said first set of tokens is a first set of HTML phonemes.

3. A method for generating structured data outputs from semi-structured data sources, said method comprising:

generating an example output from an example generator in response to an acquisition of a first plurality of annotated strings, said first plurality of annotated strings generated from an acquisition and modification of at least one data example and a corresponding coarse structure from a predetermined input specified by an external source, wherein said example output comprises a context-free grammar and a pattern dictionary;

generating a second plurality of annotated strings relating to an input from said semi-structured data sources;

acquiring said example output and said second plurality of annotated strings in an acquisition engine, said acquisition engine comprising a grammar layer and a comparison layer, said grammar layer comprising a top-down parsing algorithm; and said grammar layer and said comparison layer cooperating to generate structured data outputs from said second plurality of annotated strings based on said example output comprising the steps of:

sequentially comparing in said comparison layer said patterns in said pattern dictionary against said second plurality of annotated strings to find a matching pattern in a portion of said second plurality of annotated strings;

compiling a matching score representing a quality of a match between said patterns in said pattern dictionary and said matching pattern;

passing said matching score and said matching pattern to said grammar layer;

extending already found matching patterns with said matching pattern to form a sequence of matching patterns; and executing a set of grammar rules defined by said context-free grammar on said sequence of matching patterns to locate a legal sequence of strings defined by said set of grammar rules and representing said structured data outputs.

4. The method of claim 3 wherein compiling the matching score further comprises implementing a weighted edit distance algorithm to calculate the matching score.

5. The method of claim 4, wherein the weighted edit distance algorithm is a top down method with pruning.

6. The method of claim 4, wherein the weighted edit distance algorithm is a dynamic programming method.

7. A method for generating structured data outputs from semi-structured data sources, said method comprising:

selecting at least one data example;

creating a coarse structure defining the desired structured data outputs;

generating a first plurality of annotated strings from the at least one data example and the coarse structure;

generating an example output from the first plurality of annotated strings, the example output comprising pattern dictionary and context free grammar rules;

selecting a semi-structured data source;

generating a second plurality of annotated strings from the semi-structured data source;

acquiring said example output, and said second plurality of annotated strings in an acquisition engine, said acquisition engine comprising a grammar layer and a comparison layer; and generate the structured data output from the second plurality of annotated strings, the pattern dictionary and the context free grammar rules.

* * * * *